(12) United States Patent
Chatziioannou

(10) Patent No.: US 12,090,867 B2
(45) Date of Patent: Sep. 17, 2024

(54) SYSTEM AND METHOD FOR WIRELESS CHARGING OF AN ELECTRIC VEHICLE

(71) Applicant: Volvo Car Corporation, Gothenburg (SE)

(72) Inventor: Kostas Chatziioannou, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 263 days.

(21) Appl. No.: 17/412,863

(22) Filed: Aug. 26, 2021

(65) Prior Publication Data

US 2022/0063426 A1    Mar. 3, 2022

(30) Foreign Application Priority Data

Sep. 2, 2020 (EP) .................................... 20194110

(51) Int. Cl.
*B60L 53/12*    (2019.01)
*B60L 53/30*    (2019.01)
*B60L 53/36*    (2019.01)

(52) U.S. Cl.
CPC .............. *B60L 53/12* (2019.02); *B60L 53/305* (2019.02); *B60L 53/36* (2019.02)

(58) Field of Classification Search
CPC ......... B60L 53/12; B60L 53/305; B60L 53/36
(Continued)

(56) References Cited

U.S. PATENT DOCUMENTS 10,071,645 B2 * 9/2018 Chai ........................ B60L 53/37
10,403,113 B1 * 9/2019 Antar ..................... G01V 3/081
(Continued)

FOREIGN PATENT DOCUMENTS

CN    103107567 A    5/2013
CN    104520133 A    4/2015
(Continued)

OTHER PUBLICATIONS

Extended EP Search Report for EP Application No. 20194110.1 dated Feb. 12, 2021, 14 pages.
(Continued)

*Primary Examiner* — Suresh Memula
(74) *Attorney, Agent, or Firm* — Amin, Turocy & Watson, LLP

(57) ABSTRACT

The disclosure relates to a system for wireless charging of an electric vehicle, the system comprising: an electric vehicle having at least a wireless power transfer module and a wireless communication device; the wireless power transfer module being coupled to a battery of the electric vehicle; and a charging station having a wireless communication module and being coupled to a power source, the power source being a domestic power grid; the charging station being configured to charge the battery by wirelessly transmitting power to the wireless power transfer module; the wireless communication device being configured to send signals to the environment for detecting the charging station, waking-up the charging station or activating the wireless power transfer module; the wireless communication module being configured to switch from a standby-mode into an active mode in response to a signal from the wireless communication device; and the wireless power transfer module being configured to switch from a standby-mode into an active mode in response to the wireless communication module being in the active mode. The disclosure further relates to a method for wireless charging of an electric vehicle.

20 Claims, 3 Drawing Sheets

(58) Field of Classification Search
USPC .......................................................... 320/108
See application file for complete search history.

(56) References Cited

U.S. PATENT DOCUMENTS

| | | | |
|---|---|---|---|
| 11,548,401 B1* | 1/2023 | Malli Raghavan | ... B60L 53/305 |
| 2012/0214418 A1 | 8/2012 | Lee et al. | |
| 2012/0306433 A1* | 12/2012 | Kim ..................... | B60L 53/36 |
| | | | 307/104 |
| 2012/0309308 A1* | 12/2012 | Kim ..................... | H04B 5/26 |
| | | | 455/41.1 |
| 2012/0311363 A1* | 12/2012 | Kim ..................... | H04B 5/79 |
| | | | 713/323 |
| 2013/0179061 A1* | 7/2013 | Gadh ................... | B60L 53/305 |
| | | | 701/1 |
| 2015/0015419 A1 | 1/2015 | Halker et al. | |
| 2015/0084587 A1* | 3/2015 | Kato .................... | H02J 50/80 |
| | | | 320/108 |
| 2015/0278038 A1* | 10/2015 | Halker ................. | B60L 53/124 |
| | | | 714/3 |
| 2016/0075239 A1 | 3/2016 | Briz et al. | |
| 2017/0182903 A1 | 6/2017 | Kwasnick et al. | |
| 2019/0023140 A1 | 1/2019 | Kim et al. | |
| 2019/0121415 A1* | 4/2019 | Tong ................... | G06F 1/3287 |
| 2019/0181693 A1 | 6/2019 | Kato | |
| 2019/0283616 A1* | 9/2019 | Upward ............... | H02J 50/80 |
| 2019/0351783 A1* | 11/2019 | Goei .................... | B60L 53/63 |
| 2020/0039370 A1* | 2/2020 | Hom .................... | H02J 7/0045 |
| 2020/0079237 A1* | 3/2020 | Seong ................. | B60L 53/305 |
| 2020/0307403 A1* | 10/2020 | Rastoll ................ | B60L 53/66 |
| 2021/0276436 A1* | 9/2021 | Enderlin ............. | B60L 53/126 |
| 2022/0111747 A1* | 4/2022 | Goei .................... | B60L 53/66 |
| 2022/0379761 A1* | 12/2022 | Jang .................... | B60L 53/126 |
| 2023/0088727 A1* | 3/2023 | Seong .................. | B60L 53/66 |
| | | | 320/108 |
| 2023/0134962 A1* | 5/2023 | Lim ..................... | H02J 50/80 |
| | | | 320/108 |
| 2023/0208194 A1* | 6/2023 | Lee ...................... | H02J 50/12 |
| | | | 320/108 |
| 2023/0239795 A1* | 7/2023 | Gurumoorthy ... | H04W 52/0235 |
| | | | 455/574 |
| 2023/0239837 A1* | 7/2023 | Ye ....................... | H04W 72/02 |
| | | | 370/329 |
| 2023/0246483 A1* | 8/2023 | Park .................... | H02J 50/10 |
| | | | 320/108 |
| 2023/0261528 A1* | 8/2023 | Park .................... | H04B 5/79 |
| | | | 320/108 |

FOREIGN PATENT DOCUMENTS

| | | | | |
|---|---|---|---|---|
| CN | 106853778 A | * | 6/2017 | ............. B60L 53/60 |
| CN | 107437850 A | | 12/2017 | |
| CN | 109927567 A | | 6/2019 | |
| CN | 110015113 A | * | 7/2019 | ........... B60L 53/305 |
| CN | 110912275 A | | 3/2020 | |
| CN | 116097774 A | * | 5/2023 | ........ H04W 52/0235 |
| DE | 10-2012 010 850 A1 | | 12/2013 | |
| EP | 3670302 A1 | | 6/2020 | |
| EP | 4054053 A1 | | 9/2022 | |
| EP | 4156456 A1 | * | 3/2023 | ............. H02J 50/10 |
| JP | 2013-066363 A | | 4/2013 | |
| JP | 2014117104 A | * | 6/2014 | ............. B60L 1/003 |
| JP | 2014-155399 A | | 8/2014 | |
| KR | 20120134029 A | * | 12/2012 | |
| KR | 20120134030 A | * | 12/2012 | |
| KR | 10-2016-0034579 A | | 3/2016 | |
| KR | 20170045876 A | * | 4/2017 | |
| KR | 20170067423 A | * | 6/2017 | |
| KR | 20240002968 A | * | 1/2024 | |
| WO | 2019/098648 A1 | | 5/2019 | |
| WO | 2019229808 A1 | | 12/2019 | |

OTHER PUBLICATIONS

Decision to Grant a Patent received for European Patent Application Serial No. 20194110.1 dated Jul. 13, 2023, 2 pages.

First Office Action received for Chinese Patent Application Serial No. 202111025276.1 dated Apr. 8, 2023, 14 pages (Including English Translation).

Second Office Action received for Chinese Patent Application Serial No. 202111025276.1 dated Aug. 17, 2023, 9 pages(Including English Translation).

Notification to Grant Patent Right for Invention received for Chinese Patent Application Serial No. 202111025276.1 dated Nov. 14, 2023, 3 pages(Including English Translation).

Communication Pursuant to Rules 71(3) EPC received for EP Patent Application Serial No. 20194110.1 dated Feb. 28, 2023, 27 pages.

* cited by examiner

SYSTEM AND METHOD FOR WIRELESS CHARGING OF AN ELECTRIC VEHICLE

TECHNICAL FIELD

The present disclosure relates to a system and a method for wireless charging of an electric vehicle.

BACKGROUND ART

Wireless charging of an electric vehicle is a known and convenient method for charging a vehicle. In common practice, there is a charging station having a primary coil and a vehicle having a secondary coil. Before starting the charging of the vehicle, a communication between the charging station and the vehicle needs to be initiated and established. There are known methods for switching a stationary charging station of a charging system for inductively charging the battery of an electrically driven vehicle from an idle state with low power consumption to an operating state by using signals being sent from parking sensors provided on the vehicle to wake-up the charging station. The charging station-side reception device comprises sensors for receiving such signals.

SUMMARY

There may, therefore, be a need to provide an alternative wireless charging system and method, particularly a system and/or method having a reduced energy consumption.

The object of the present disclosure is solved by the subject-matter of the appended independent claims, wherein further embodiments are incorporated in the dependent claims.

According to a first aspect, there is provided a system for wireless charging of an electric vehicle, such as a hybrid vehicle and an all-electric vehicle. The system comprises an electric vehicle, and an at least partially stationary charging station. The electric vehicle has at least a wireless power transfer module and a wireless communication device, the wireless power transfer module being coupled to a battery of the electric vehicle. The charging station has a wireless communication module and is coupled to a power source, the power source being a domestic power grid. The charging station is configured to charge the battery by wirelessly transmitting power to the wireless power transfer module of the electric vehicle. The wireless communication device of the electric vehicle is configured to send signals to the environment for detecting the charging station, waking-up the charging station and/or activating the wireless power transfer module. The wireless communication module of the charging station is configured to switch from a standby-mode into an active mode in response to a signal from the wireless communication device. And the wireless power transfer module is configured to switch from a standby-mode into an active mode in response to the wireless communication module being in the active mode.

By switching the wireless communication module into active mode, the charging station is switched into an active mode being a mode configured to transmit power to the wireless power transfer module. The system allows a reduced energy consumption and therefore a reduction in energy costs compared to systems that do not provide a standby-mode for the charging station. Furthermore, the wireless power transfer module is also provided with a standby-mode, which allows to reduce the energy consumption of the vehicle resulting in longer driving ranges.

According to an embodiment, the electric vehicle may further comprise an electric vehicle charging controller for controlling the charging of the battery.

The electric vehicle charging controller may control the charging of the battery such that the electric vehicle charging controller activates the wireless communication device only when the state of charge of the battery drops below a threshold and/or signaling when the battery is fully charged.

According to an embodiment, the electric vehicle may further comprise a vehicle control unit for controlling the wireless power transfer module and the electric vehicle charging controller.

The vehicle control unit may be integrated into the overall electronic vehicle control and may control the threshold for activating the wireless communication device dependent on a planned route in a navigation system and/or may deactivate the wireless power transfer module when the electric vehicle charging controller is signaling that the battery is fully charged.

According to an embodiment, the wireless power transfer module and the electric vehicle charging controller may be implemented integrated to each other.

This reduces the amount of parts thereby reducing the production costs and a required installation space.

Alternatively, according to another embodiment, the wireless power transfer module and the electric vehicle charging controller may be implemented separate to each other.

A separate implementation may be more flexible for using the installation space already existing in the electric vehicle.

According to an embodiment, the wireless communication device may be implemented into the electric vehicle charging controller.

According to an embodiment, detecting the charging station may be implemented via geo-fencing, software logic, or smart sensors of an active safety system of the vehicle.

Geo-fencing allows an automated detecting of the charging station when the vehicle enters an area defined by virtual boundaries (fence). Detecting the charging station being implemented by software logic may allow that the wireless communication device sends signals as long as the electric vehicle drives in low-speed. Smart sensors of an active safety system may also allow that the wireless communication device sends signals as long as the electric vehicle drives in low-speed and additionally provide assistance for aligning the electric vehicle to the charging station.

According to an embodiment, waking-up the charging station may be implemented via wake-on-wireless-LAN-concept (WoWLAN), ultrawide-band (UWB) or Bluetooth-low-energy (BLE) technology. Further, there may be other types of beacons for waking-up the charging station.

According to an embodiment, the electric vehicle may be aligned to the charging station before charging.

The alignment may ensure that the wireless power transfer module is in the correct position relative to the charging station. The alignment may be performed by using smart sensors provided on the electric vehicle, such as parking sensors and/or adaptive cruise control sensors. Additionally or alternatively, also ultra-wideband (UWB) and/or Bluetooth low energy may be used for aligning the electric vehicle to the charging station.

According to an embodiment, the wireless communication device of the electric vehicle and the wireless communication module of the charging station may be initially paired.

An initial pairing of the wireless communication device and the wireless communication module may allow that the wireless communication device identifies the paired communication module as corresponding to its "home-station" and only sends a waking-up signal to the charging station if the detected charging station corresponds to its "home-station". Otherwise, the wireless communication device continues sending signals for detecting its "home-paired" charging station.

According to a second aspect, there is provided a method for wireless charging of an electric vehicle. The method comprises the following steps: providing an electric vehicle having at least a wireless power transfer module and a wireless communication device; the wireless power transfer module being coupled to a battery of the electric vehicle; providing a charging station having a wireless communication module and being coupled to a power source, the power source being a domestic power grid, the charging station being configured to charge the battery by wirelessly transmitting power to the wireless power transfer module; sending signals to the environment by means of the wireless communication device for detecting the charging station, waking-up the charging station and/or activating the wireless power transfer module; switching the wireless communication module from a standby-mode into an active mode in response to a signal from the wireless communication device; and switching the wireless power transfer module from a standby-mode into an active mode in response to the wireless communication module being in the active mode.

The method may be at least partly computer-implemented, and may be implemented in software and/or in hardware. The method allows deactivating the charging station in case of not being used and thereby reducing the energy consumption of the charging station. Furthermore, by activating the wireless power transfer module in response to the charging station being in active mode, the energy consumption of the vehicle may be also reduced.

According to an embodiment, sending signals to the environment by means of the wireless communication device for detecting the charging station, waking up the charging station may further comprise: sending a first signal to the environment for detecting the charging station by means of the wireless communication device of the electric vehicle; detecting the charging station by means of the wireless communication device of the electric vehicle; and sending a second signal to the detected charging station for waking-up the charging station by means of the wireless communication device of the electric vehicle.

The first signal for detecting the charging station and the second signal for waking-up the charging station may be of the same signal type or may be of different signal types.

According to an embodiment, switching the wireless communication module from a standby mode into an active mode may further comprise signaling to be in active mode to the wireless communication device by means of the wireless communication module; and switching the wireless power transfer module from a standby mode to an active mode may further comprise sending a third signal to the wireless power transfer module for waking-up the wireless power transfer module by means of the wireless communication device; switching the wireless power transfer module from a standby-mode to an active mode in response to the third signal; and wirelessly transferring power to the electric vehicle via wireless power transfer to the wireless power transfer module for charging the battery of the electric vehicle by means of the charging station. Alternatively, waking-up the wireless power transfer module may be performed by using a wired communication for sending the third signal, e.g. via a CAN-bus.

The third signal may be of another different signal type. The wireless power transfer module is only in active mode if the detected charging station is in active mode. Thus, the energy consumption of the vehicle may be reduced.

According to an embodiment, the charging station may switch from the active mode back to the standby mode when the battery of the electric vehicle is fully charged. Further, the charging station may switch from the active mode back to the standby mode due to inactivity, e.g. in case of error, due to manually stopping the charging process or due to achieving a predefined charging level.

If the electric vehicle is signaling that the battery is fully charged, e.g. by means of the wireless communication device and/or the wireless power transfer module, to the charging station, the charging station may promptly return to the standby-mode. Thus, the period of time in which the charging station is in active mode related to an increased energy consumption, is reduced. This results in optimizing the energy consumption of the charging station and reducing the energy costs.

According to an embodiment, the charging station may switch from the active mode back to the standby mode when charging of the battery of the electric vehicle is interrupted by moving the electric vehicle out of range.

In this case, the charging system may recognize the absence of the electric vehicle, e.g. by sending a small amount of power up (low power excitation) and getting no response, or by receiving a signal that the vehicle exits the geo-fence-area or the like, and promptly returns to the standby-mode corresponding to a low-energy-consumption mode. The period of time in which the charging station is in active mode related to an increased energy consumption, is reduced. This results in optimizing the energy consumption of the charging station and reducing the energy costs.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

The figures are merely schematic representations and serve only to illustrate embodiments of the disclosure. Identical or equivalent elements are in principle provided with the same reference signs.

DESCRIPTION OF EMBODIMENTS

Figure 1:
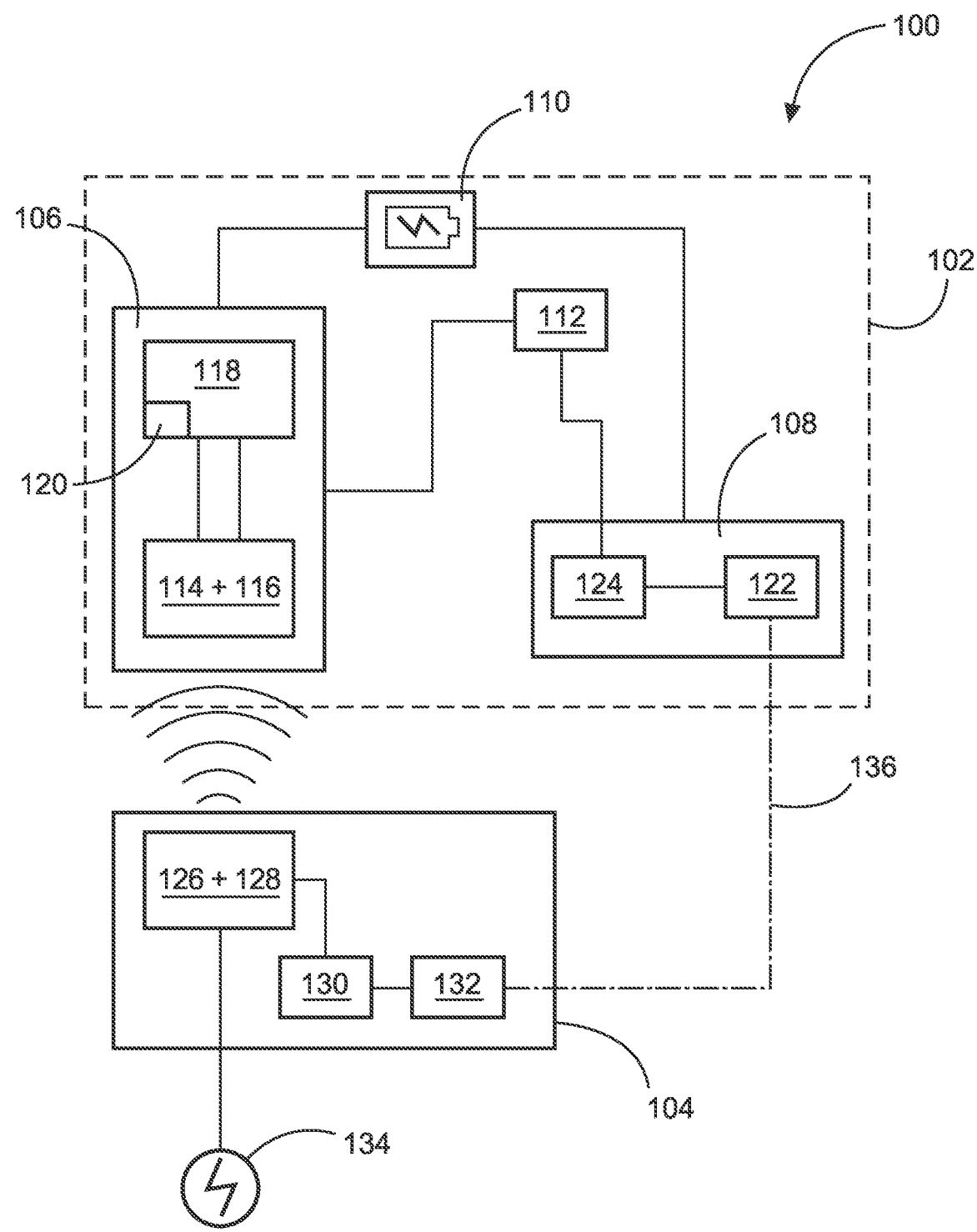
FIG. 1 shows a schematic view of an exemplary embodiment of a system for wireless charging of an electric vehicle.

FIG. 1 shows an embodiment of a system 100 for wireless charging of an electric vehicle 102 in a schematic block diagram. The system 100 comprises the electric vehicle 102 and a charging station 104.

In this embodiment, the electric vehicle 102 may be a hybrid vehicle or a pure electric vehicle and comprises a wireless power transfer module 106, an electric vehicle charging controller 108, a battery 110, and a vehicle control unit 112. The wireless power transfer module 106 comprises coils 114 and a compensation network 116 as well as a rectifier 118 having a micro-controller unit 120. The rectifier 118 of the wireless power transfer module 106 is coupled to the battery 110 and is coupled to the coils 114. The electric vehicle charging controller 108 comprises a wireless communication device 122 and a micro-controller unit 124. The vehicle control unit 112 is coupled to the micro-controller unit 120 of the wireless power transfer module 106 and the micro-controller unit 124 of the electric vehicle charging controller 108 and configured to control the wireless power transfer module 106, in particular the rectifier 118, and the electric vehicle charging controller 108 via the respective micro-controller units 120, 124. Further, the vehicle control unit 112 may be configured to control several other components of the vehicle, in particular assistance systems which may be embedded in a vehicle software.

In this embodiment, the charging station 104 comprises coils 126, power electronics 128, a micro-controller unit 130 and a wireless communication module 132. The coils 126 and power electronics 128 are coupled to an external power grid 134 as a power supply. The coils 128 are configured to wirelessly transfer power to the coils 114 of the wireless power transfer module 106, when the electric vehicle 102 is correctly aligned to the charging station 104. The wireless communication device 122 is configured to wirelessly communicate with the wireless communication module 132 as indicated by a dotted line 136, when the electric vehicle 102 is in a predefined area around the charging station 104.

Although, the wireless power transfer module 106 and the electric vehicle charging controller 108 are shown as two separate elements, they may be implemented as one integral element only. Also, in some embodiments, there may be no connection to the vehicle control unit 112.

Figure 2:
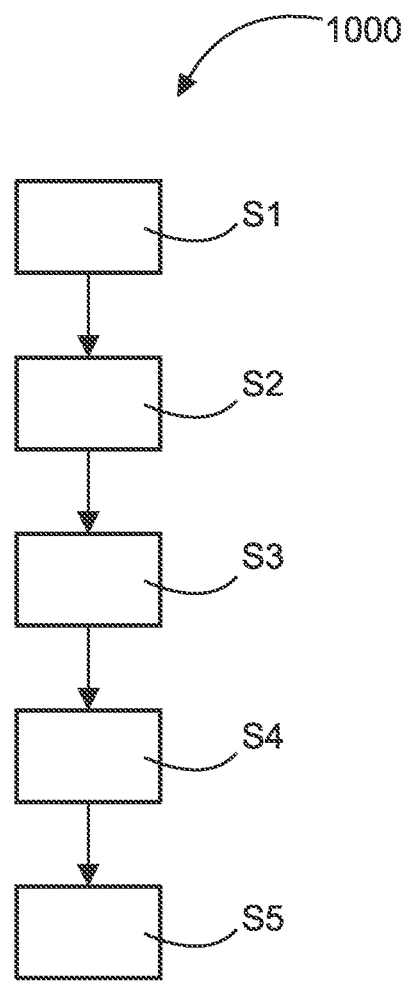
FIG. 2 shows a flowchart, schematically illustrating an exemplary embodiment of a method for wireless charging of an electric vehicle.
Figure 3:
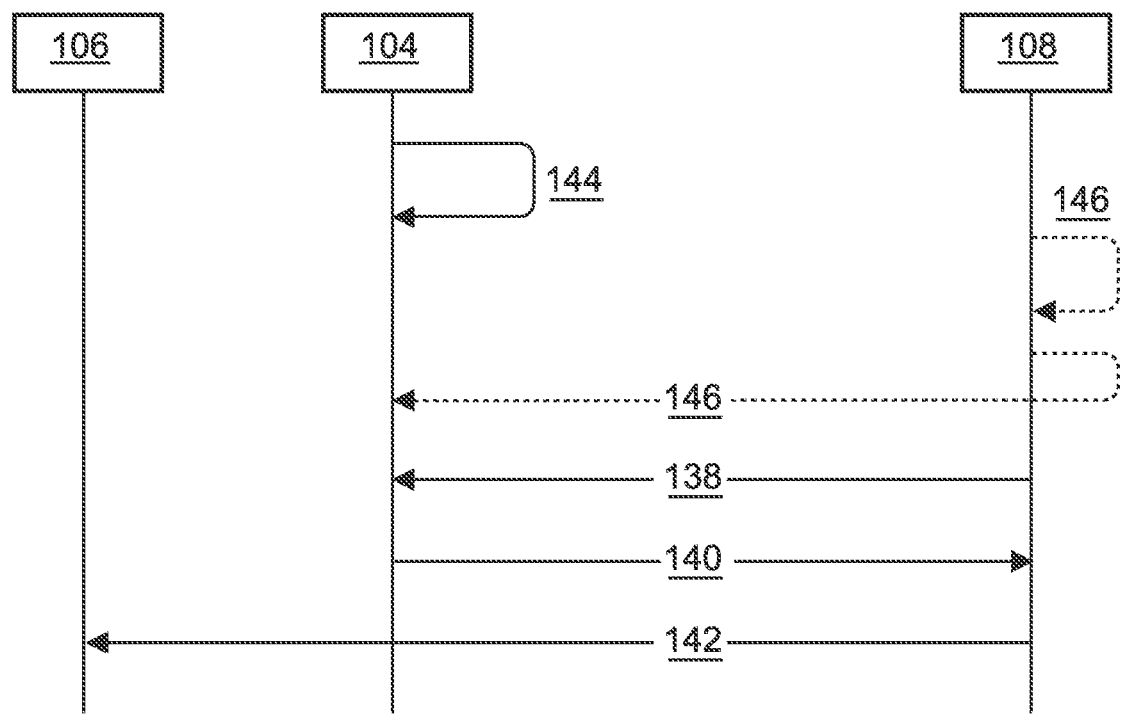
FIG. 3 shows a functional chart of a communication between an electric vehicle and a charging station according to an embodiment.

FIG. 2 shows a flowchart of a method 1000 according to an embodiment and FIG. 3 shows a functional chart of a communication between the electric vehicle 102 and the charging station 104 according to an embodiment illustrating a sequence of the method 1000 shown in FIG. 2.

The method 1000 provides the electric vehicle 102 comprising at least the wireless power transfer module 106 being coupled to the battery 110, and the wireless communication device 122 (step S1). Further, the charging station 104 is provided, comprising at least the wireless communication module 132, and being coupled to the power source 134 (step S2). Next, the wireless communication device 122 sends signals to the environment for detecting the charging station 104, waking-up the charging station 104 and/or activating the wireless power transfer module 106 (step S3). When the charging station 104 has been detected, and a wake-up signal 138 (see FIG. 3) has been sent from the wireless communication device 122, the wireless communication module 132 switches from a standby-mode into an active mode for activating the charging station 104 (step S4). The charging station 104 being activated corresponds to the charging station 104 being in an operational state. The wireless communication module 132 indicates being in active mode, e.g. by sending a response signal 140 (see FIG. 3) to the wireless communication device 122 and in response to this, the wireless power transfer module 106 switches from a standby-mode into an active mode, e.g. by sending a wake-up signal 142 different to the wake-up signal 138 (see FIG. 3) to the wireless power transfer module 106 via the wireless communication device 122 (step S5).

The functional chart of FIG. 3 illustrates the steps S3 to S5 of the above mentioned method 1000. Although, the wireless communication device 122 and the wireless power transfer module 106 are shown as separate components, they may be implemented together as one component.

The charging station 104 is in standby-mode as long as the electric vehicle 102 is not in range, represented by an arrow 144. When the electric vehicle 102 comes in range of the charging station 104, the wireless communication device 122 starts repetitively sending a detection signal 146 for detecting the charging station 104 until the charging station 104 is detected. When the wireless communication device 122 has detected the charging station 104, it sends the wake-up signal 138 for waking-up the charging station 104. When the charging station 104 has woken up, the wireless communication module 132 sends the response signal 140 to the wireless communication device 122 and in response to that signal, the wireless communication device 122 sends the wake-up signal 142 for waking up the wireless power transfer module.

Figure 4:
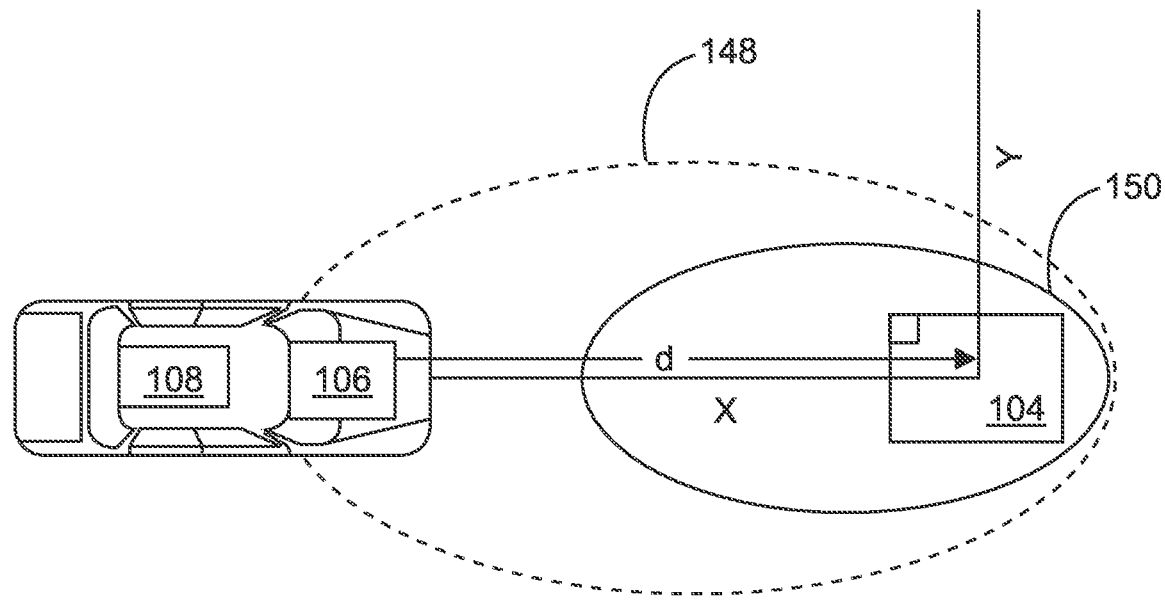
FIG. 4 shows a schematic view illustrating an area for detecting the charging station and for aligning a vehicle to a charging station.

FIG. 4 shows a schematic view illustrating an area for detecting the charging station and for aligning a vehicle to a charging station. According to an embodiment, when the electric vehicle 102 is in range (e.g., distance d) of the charging station 104, there are a first area 148 in which the electric vehicle 102 can be positioned relative to the charging station 104 and a second area 150 within the first area 148, in which the electric vehicle 102 can be correctly aligned to the charging station 104. The positioning and/or alignment may be computer-implemented and may be implemented in software and/or in hardware, e.g. may be embedded in the vehicle control unit 112.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A system for wireless charging of an electric vehicle, the system comprising:
   an electric vehicle having at least a wireless power transfer module and a wireless communication device, the wireless power transfer module being coupled to a battery of the electric vehicle;
   wherein the wireless communication device is configured to:

repetitively send detection signals to the environment for detecting a charging station having a wireless communication module and coils being coupled to a power source, the power source being a domestic power grid, the charging station being configurable to charge the battery by wirelessly transmitting power to the wireless power transfer module, and in response to detecting the charging station:

send a first wake-up signal to the charging station for waking-up the charging station, the wireless communication module being configured to switch from a standby-mode into an active mode in response to the first wake-up signal from the wireless communication device, and send a second wake-up signal to the wireless power transfer module of the electric vehicle for activating the wireless power transfer module, the wireless power transfer module being configured to switch from a standby-mode into an active mode in response to the second wake-up signal from the wireless communication device.

2. The system of claim 1, the electric vehicle further comprising an electric vehicle charging controller for controlling the charging of the battery.

3. The system of claim 1, the electric vehicle further comprising a vehicle control unit for controlling the wireless power transfer module and the electric vehicle charging controller.

4. The system of claim 2, the wireless power transfer module and the electric vehicle charging controller being implemented integrated to each other.

5. The system of claim 2, the wireless power transfer module and the electric vehicle charging controller being implemented separate from each other.

6. The system of claim 2, the wireless communication device being implemented into the electric vehicle charging controller.

7. The system of claim 1, wherein detection of the charging station being implemented via geo-fencing, software logic, or smart sensors of an active safety system of the vehicle.

8. The system of claim 1, the first wake-up signal being implemented via wake-on-wireless-LAN-concept (WoWLAN), ultrawide-band (UWB) or Bluetooth-low-energy (BLE) technology.

9. The system of claim 1, the electric vehicle being aligned to the charging station before charging.

10. The system of claim 1, the wireless communication device of the electric vehicle and the wireless communication module of the charging station being initially paired.

11. The system of claim 1, the wireless power transfer module being configured to wirelessly transfer power to the electric vehicle from the charging station for charging the battery of the electric vehicle, in response to switching from the standby-mode to the active mode.

12. A method for wireless charging a battery of an electric vehicle comprising:

repetitively sending, by the electric vehicle, via a wireless communication device of the electric vehicle, detection signals to the environment for detecting a charging station;

in response to detecting the charging station:

sending, by the electric vehicle, via the wireless communication device, a first wake-up signal to the charging station for waking-up the charging station, wherein the waking up of the charging station comprises switching a wireless communication module of the charging station from a standby-mode into an active mode; and sending, by the electric vehicle, via the wireless communication device, a second wake-up signal to a wireless power transfer module of the electric vehicle for switching the wireless power transfer module from a standby-mode into an active mode.

13. The method of claim 12, further comprising:

switching, by the wireless power transfer module of the electric vehicle, from the standby-mode to the active mode in response to the second wake-up signal; and wirelessly transferring, by the wireless power transfer module of the electric vehicle, power to the electric vehicle from the charging station for charging the battery of the electric vehicle.

14. The method of claim 13, further comprising:

controlling, by an electric vehicle charging controller of the electric vehicle, the charging of the battery.

15. The method of claim 14, wherein the wireless power transfer module and the electric vehicle charging controller being implemented integrated to each other.

16. The method of claim 14, wherein the wireless power transfer module and the electric vehicle charging controller being implemented separate from each other.

17. The method of claim 12, the charging station switching from the active mode back to the standby mode when the battery of the electric vehicle is fully charged.

18. The method of claim 12, the charging station switching from the active mode back to the standby mode when charging of the battery of the electric vehicle is interrupted by moving the electric vehicle out of range.

19. The method of claim 12, wherein the detecting of the charging station being implemented via geo-fencing, software logic, or smart sensors of an active safety system of the vehicle.

20. The method of claim 12, wherein the first wake-up signal being implemented via wake-on-wireless-LAN-concept (WoWLAN), ultrawide-band (UWB) or Bluetooth-low-energy (BLE) technology.

* * * * *